United States Patent [19]

Kober et al.

[11] 4,219,873
[45] Aug. 26, 1980

[54] PROCESS FOR CONTROLLING OPERATION OF AND DATA EXCHANGE BETWEEN A PLURALITY OF INDIVIDUAL COMPUTERS WITH A CONTROL COMPUTER

[75] Inventors: Rudolf Kober, Munich; Herbert Kopp, Sauerlach; Christian Kuznia, Munich, all of Fed. Rep. of Germany

[73] Assignee: Siemens Aktiengesellschaft, Berlin & Munich, Fed. Rep. of Germany

[21] Appl. No.: 732,988

[22] Filed: Oct. 15, 1976

[30] Foreign Application Priority Data

Oct. 15, 1975 [DE] Fed. Rep. of Germany ....... 2546202

[51] Int. Cl.² .............................................. G06F 15/16
[52] U.S. Cl. ................................................... 364/200
[58] Field of Search .......................... 364/200 MS File

[56] References Cited

U.S. PATENT DOCUMENTS

| 3,229,260 | 1/1966 | Falkoff | 364/200 |
|---|---|---|---|
| 3,348,210 | 10/1967 | Ochsner | 364/200 |
| 3,374,465 | 3/1968 | Richmond | 364/200 |
| 3,480,914 | 11/1969 | Schlaeppi | 364/200 |
| 3,530,438 | 9/1970 | Mellen | 364/200 |
| 3,560,934 | 2/1971 | Ernst | 364/200 |
| 3,560,935 | 2/1971 | Beers | 364/200 |
| 3,566,357 | 2/1971 | Ling | 364/200 |
| 3,593,300 | 7/1971 | Driscoll, Jr. | 364/200 |
| 3,618,045 | 11/1971 | Campbell | 364/200 |
| 3,905,023 | 9/1975 | Perpiglia | 364/200 |

*Primary Examiner*—James D. Thomas
*Attorney, Agent, or Firm*—Hill, Van Santen, Steadman, Chiara & Simpson

[57] ABSTRACT

A computer system comprises a control or supervisory computer and a plurality of individual computers which are connected to and cooperate with each other under control of a process which establishes a three phase operation. In a control phase only the control computer operates, executes its program and informs the individual computers which function they must carry out during the next phase, the autonomous phase. In the autonomous phase the individual computers simultaneously and independently fulfill their assigned functions and report completion thereof to the control computer. Finally, a communication phase is utilized for a data exchange between the computers.

3 Claims, 21 Drawing Figures

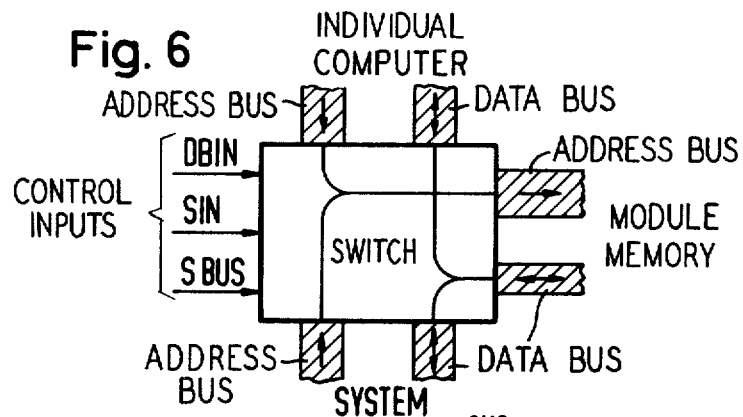
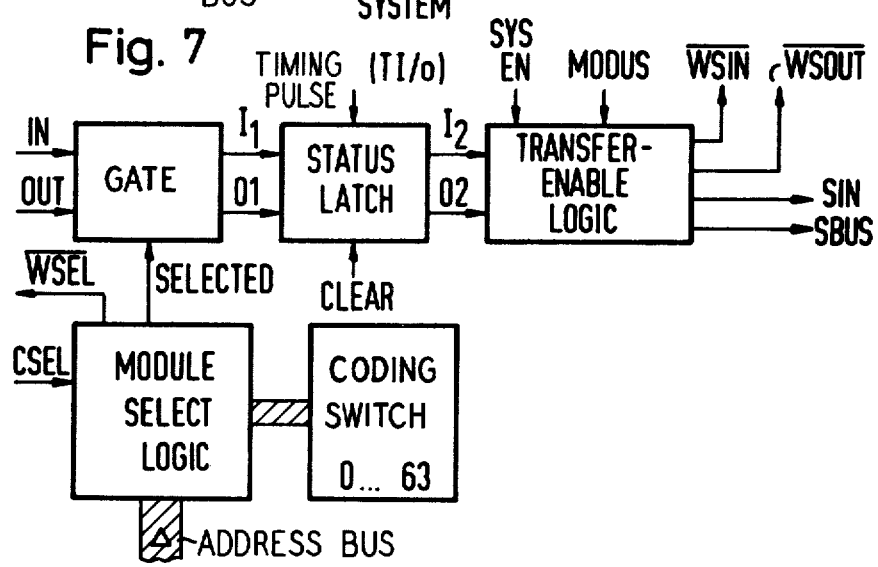
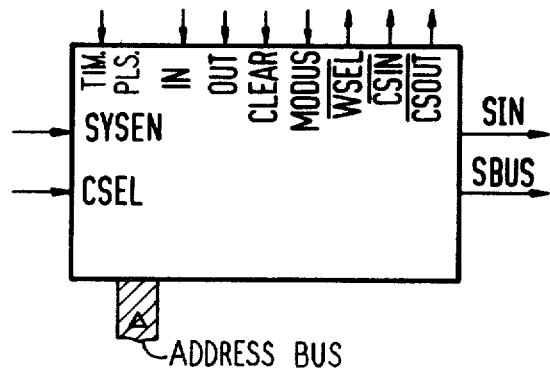

Fig. 17
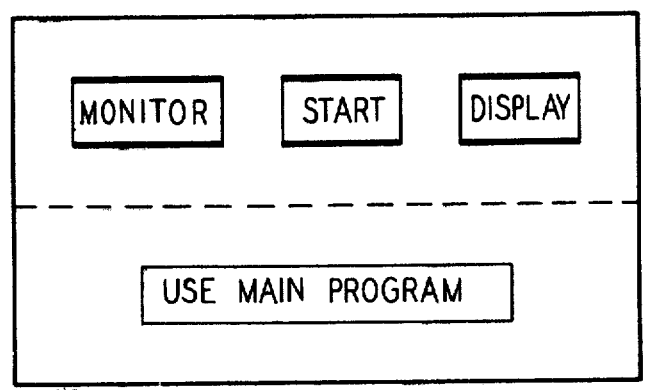
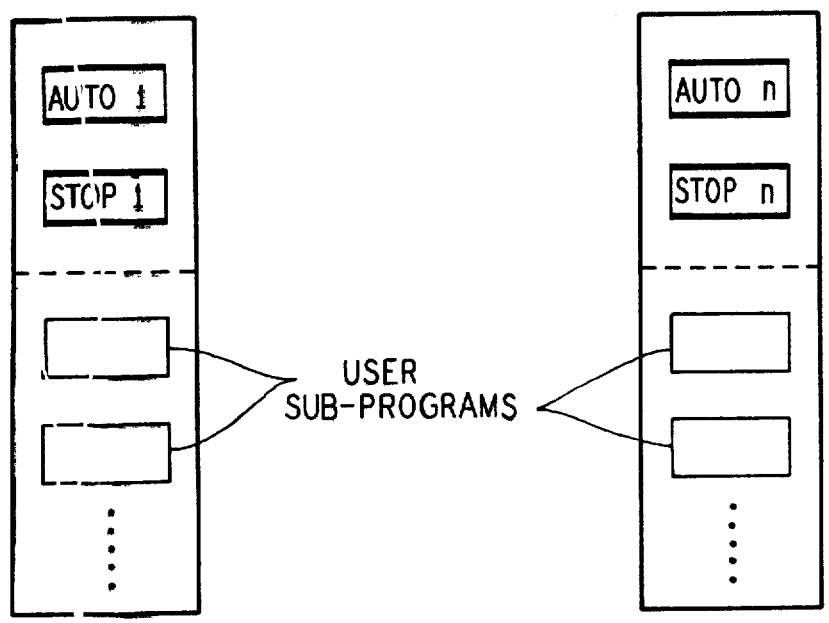

PROCESS FOR CONTROLLING OPERATION OF AND DATA EXCHANGE BETWEEN A PLURALITY OF INDIVIDUAL COMPUTERS WITH A CONTROL COMPUTER

BACKGROUND OF THE INVENTION

Field of the Invention

Data processing systems which, for purposes of simultaneous problem processing, provide a plurality of calculating units, central units or computers (multiprocessors), have gained significance in the past. On the other hand, the development of highly integrated calculating units in the form of so-called microprocessors have provided the possibility of constructing such multi-computer systems from a plurality of sub-computers. With an increasing number of sub-computers, however, the problems of data traffic between the individual sub-computers and external memories and the like increase considerably.

SUMMARY OF THE INVENTION

The object of the present invention is thus to provide a computer system consisting of a plurality of individual computers which are connected to one another and cooperate with one another, in which the above-discussed problems, which result from the frequency of the data traffic between the individual sub-computers, do not occur.

The invention realizes this object by a computer system of the type described in the introduction which is characterized by a control or supervisory computer and a plurality of individual computers, memories assigned to the control-or supervisory computer and the individual computers, switching devices assigned to the individual computers, via which devices the memory imputs and outputs of the individual computers are connected to the control-or supervisory computer and which are controlled by the control-or supervisory computer.

The present invention also provides a process for the operation of such a computer system, where the computer system operates in a three-phase operation, namely in a control phase during which only the control-or supervisory computer operates, executes its program and informs the individual computers which function they must carry out in the following phase, the autonomous during which the individual computers carry out the functions which they have been assigned, simultaneously and independently of one another without being connected to the control computer or its memory, and then report the execution of their function in the form of a stop signal to the control computer, and a subsequent communication phase which starts when the control computer has received stop signals from all the individual computers or a selection of the individual computers determined by a circuit, and during which, under the control of the control computer, the data is exchanged between the memories of the individual computers and possibly the main memory.

In the computer system in accordance with the invention, during the execution of their programs the individual computers cooperate exclusively with their private memories. Thus, it is unnecessary to gain access to common external memories. Therefore, no access problems occur.

BRIEF DESCRIPTION OF THE DRAWINGS

Other objects, features and advantages of the invention, its organization, construction and operation will be best understood from the following description, taken in conjunction with the accompanying drawings, on which:

FIG. 6 is a schematic illustration of the switch;

FIG. 7 is a block circuit diagram of the switch control logic;

FIG. 8 is a schematic illustration of the switch control logic;

DESCRIPTION OF THE PREFERRED EMBODIMENTS

Figure 1:
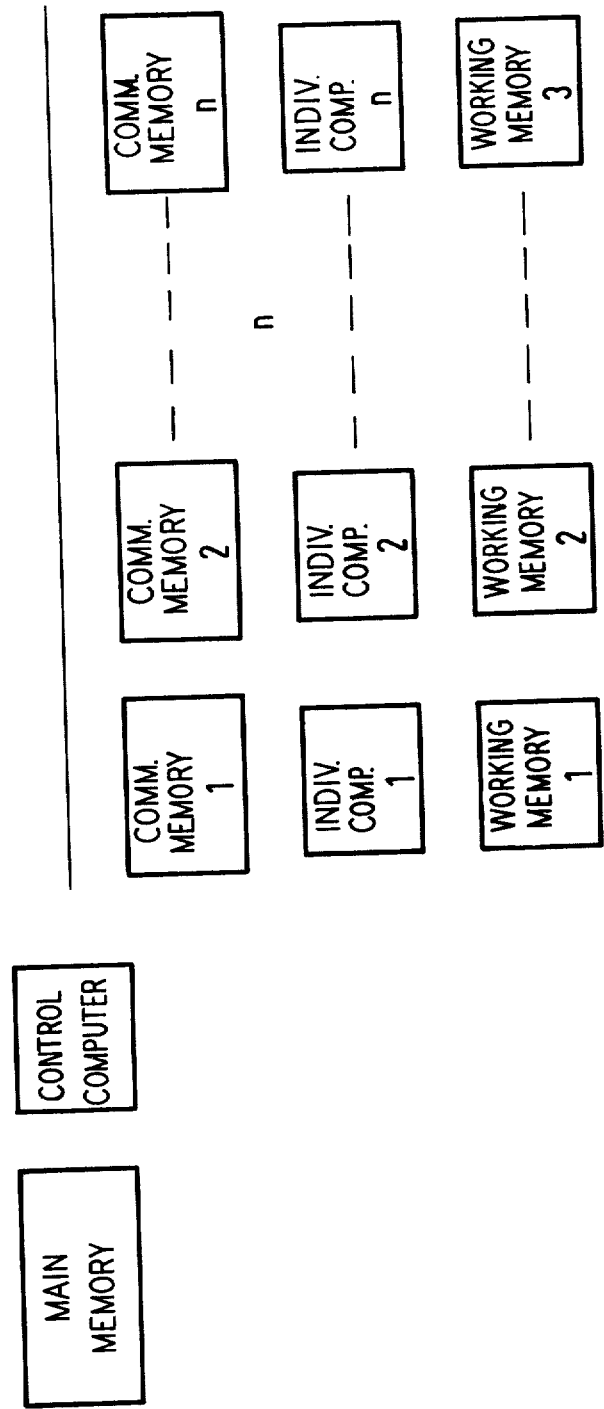
FIG. 1 shows the fundamental construction of a computer system in accordance with the invention.
Figure 2:
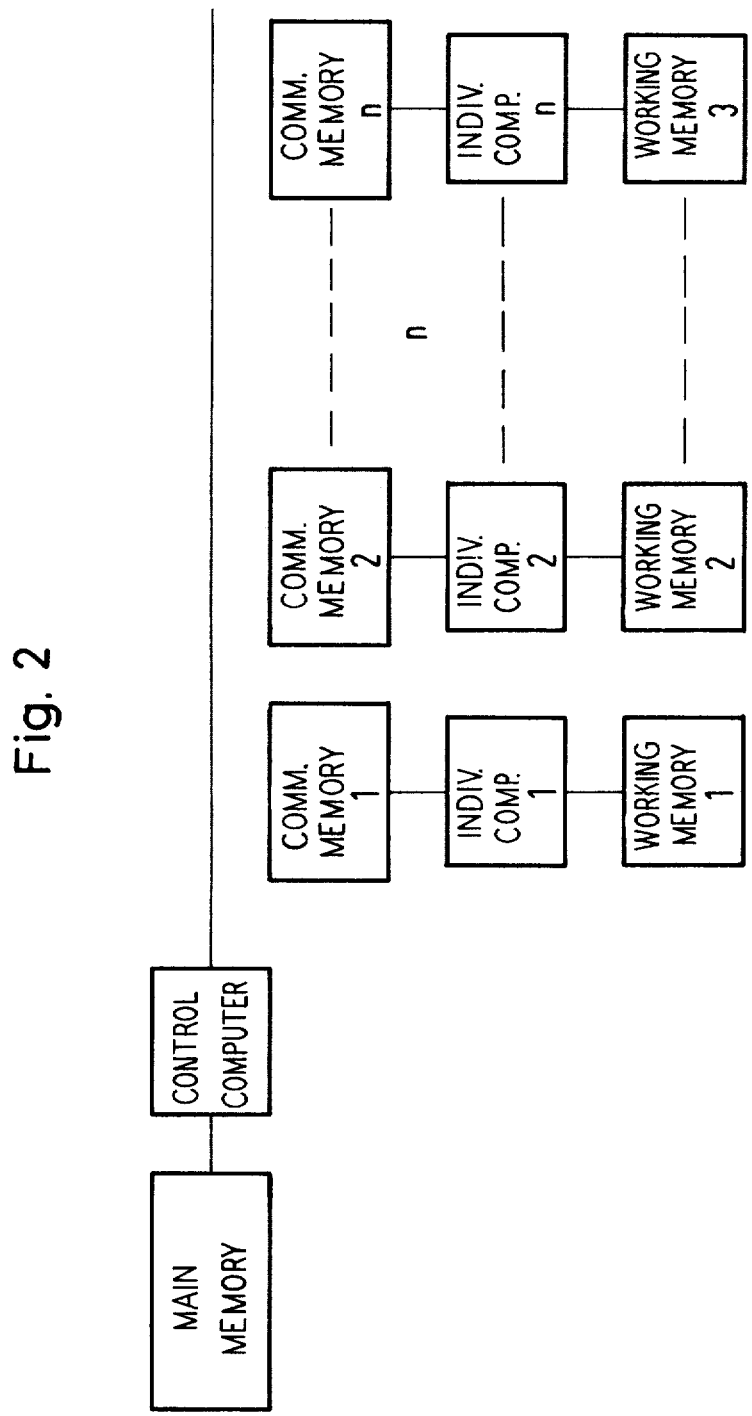
FIG. 2 shows the computer system in accordance with the invention during the autonomous phase.
Figure 3:
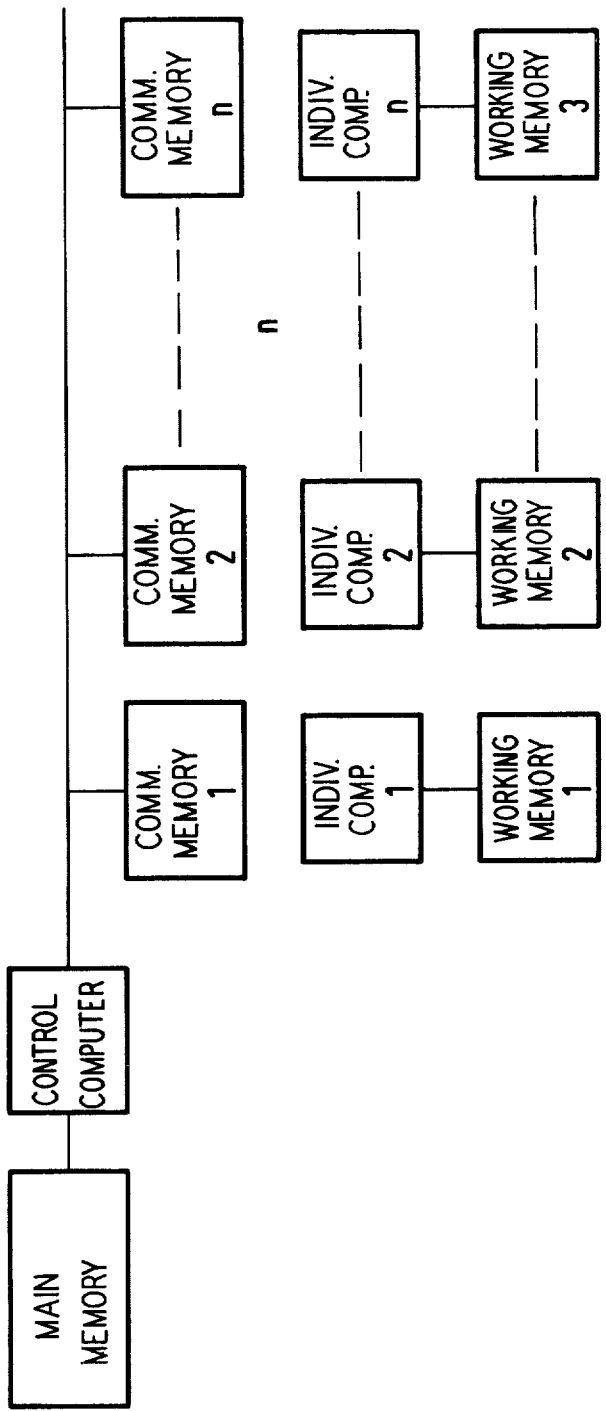
FIG. 3 shows the computer system in accordance with the invention during the control-and communication phase.

FIGS. 1, 2 and 3 show the general construction of the computer system in accordance with the invention and serve to explain the function thereof. As will be seen, the computer system of the invention consists of a control computer with its own main store and an arbitrary number of modules, each of which consist of an individual computer and an associated communication memory and private memory. FIG. 2 shows the operation of the computer system in its autonomous phase, during which phase each individual computer has access to its communication memory and to its private memory and operates separately from the other computers and from the control computer. During this time each of the individual computers executes the program which it has been assigned. FIG. 3 shows the computer system in accordance with the invention during the control phase or the communication phase. During the control phase only the control computer is in operation, and during this time has access both to its own main memory and also to the communication memories of the individual computers. Also during the communication phase the data flows corresponding to FIG. 3 follow. During this phase the control computer controls the communication between the communication memories of the individual computers one between another and between the communication memories and the main memory.

Figure 4:
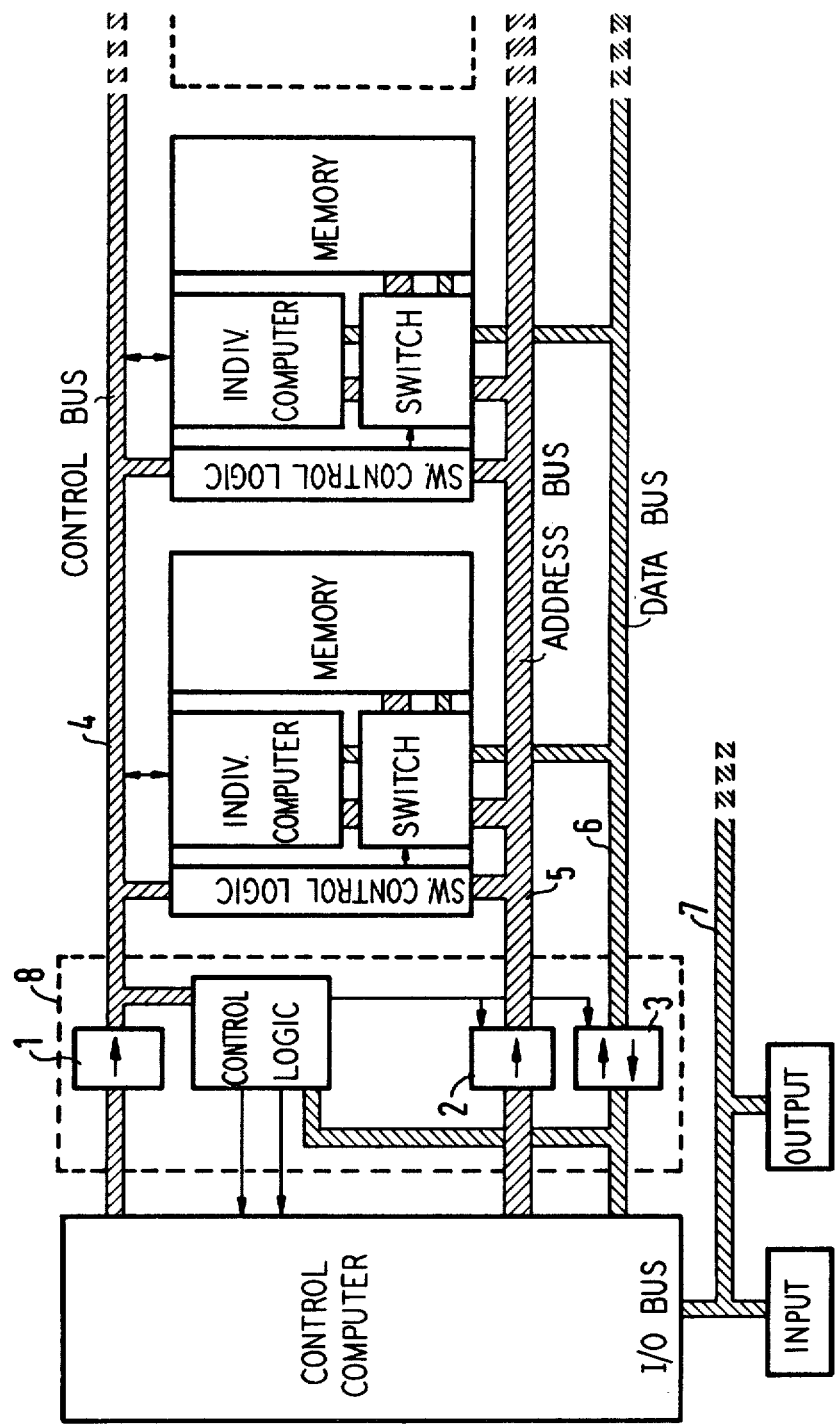
FIG. 4 is a block circuit diagram of a computer system in accordance with the invention.

FIG. 4 shows the construction of a computer system in accordance with the invention in the form of a block circuit diagram. The control computer and its memory is connected via three data busbars 4, 5, 6 to the individual modules. Each of these modules consists of an individual computer, a memory, a switch and a switch control logic. Each of these memories comprises the communication and private memories which are illustrated in FIGS. 1 to 3 and are assigned to each module. The switches serve to selectively connect the memory, in dependence upon the momentary phase either to the individual computer or to the data bus 6. The switch is controlled by a switch control logic. The switching state of the switch is retained until a new switching command is received. The data bus 6 transmits 8 bit-data. The address bus 5 transmits 16 bit-addresses. The address bus also transmits control commands for the module control logic. These commands consist of 7 bit switching addresses which represents the number of the particular module to have been approached, and of a switching command consisting 1 bit. The control bus 4, which is also provided, serves to transmit the signals for the coordination of the various parts of the computer system. These are primarily signals which trigger and terminate the individual program phases (start phase for the individual module, stop signals, interrupt signals for the control computer). Also, together with the address bus they transmit signals for the control of the switches. Finally they transmit the two-phase timing signal for the individual computers. The illustrated computer system also comprises a block 8 referred to as "interface" which in addition to a control logic comprises bus drive devices 1, 2 and 3. The control computer is also connected via an input and output line to input-and output devices.

In the exemplary embodiment the control computer is in the form of a micro-computer Intellec 8/M80 whose 12 K-byte store serves as main memory.

Figure 5:
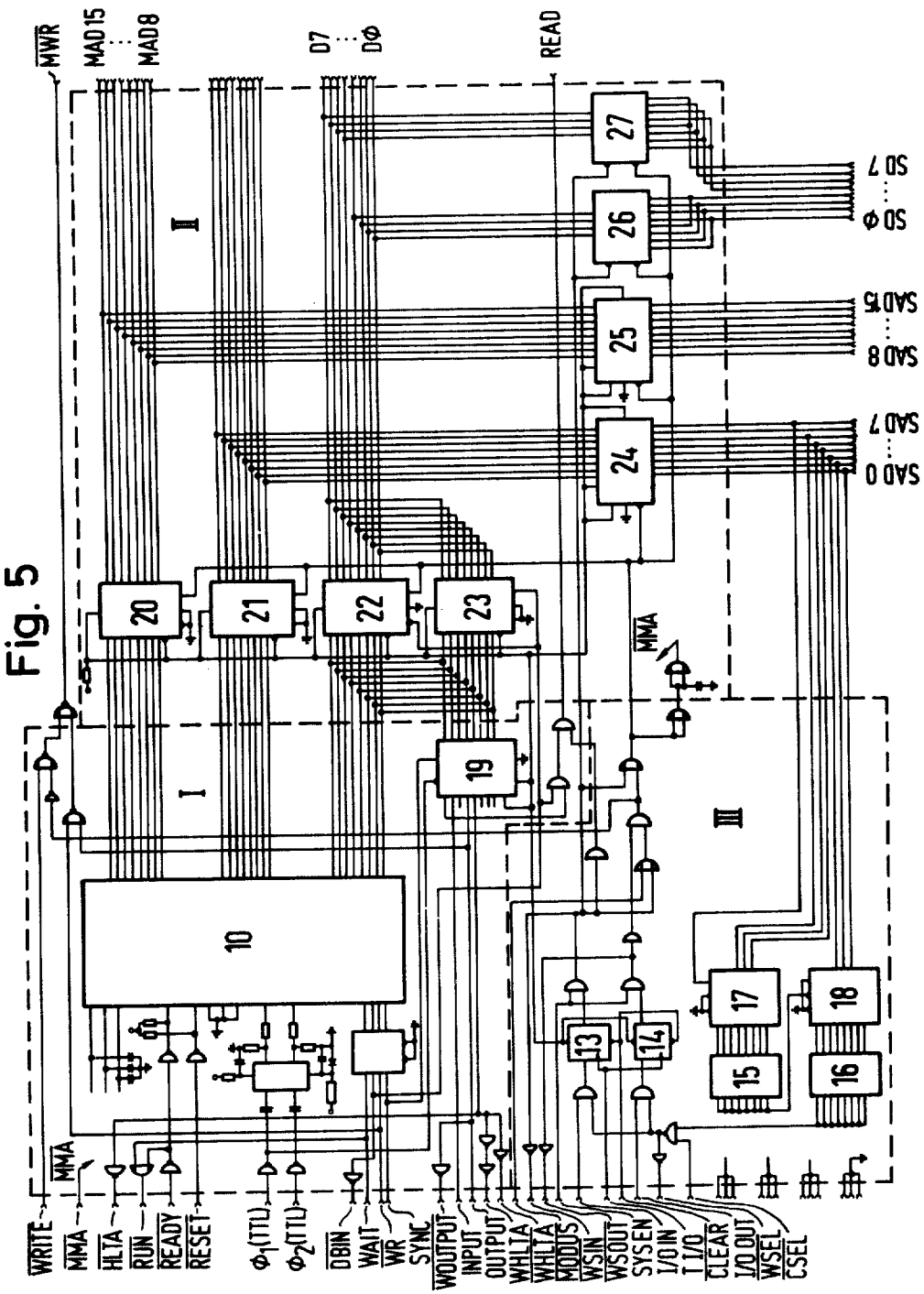
FIG. 5 shows the complete circuit of the individual computer with the associated switches and memories.

FIG. 5 shows the complete circuit of a computer module. A computer module of this type basically comprises three units, the individual computer I, the switch II and the switch control logic III. In the exemplary embodiment the construction has been effected almost exclusively with modules of the firm Intel Corporation corresponding to Intel Catalogue of 1975. An essential component of the individual computer is the microprocessor element 8080 of the firm Intel. The individual computer also contains two two-path bus drive devices 12 and 19 of the Type 8216 of the firm Intel, and also one pulse train drive device 11 of the type MHOO26CM of the firm National Semiconductor Corp. corresponding to the data sheet February 1972. The terminal designations in the figure conform with those of the above-mentioned supplier firms.

The switch II is constructed from input/output elements 20, 21, 22, 23, 24 and 25 of the type 8212 of the firm Intel and of two bus drive devices 26, 27 of the type 8216 of the firm Intel.

Finally the switch control logic III consists of two 1-out-of 8 binary decoders 17, 18 of the type 3205 of the firm Intel, of two bus switches 15, 16 and of two D-flip-flops 13, 14 of the type Siemens Ser. No. 7474 (Siemens Data Book 1976/77 "Digital Circuits"). The circuit also contains a series of gates, resistors, capacitors and diodes, as can be directly seen from the figure.

The module represented in FIG. 5 is connected via the lines $D_O$ to $D_7$, $MAD_O$ to $MAD_{15}$, $\overline{MW}_R$ and READ to the module store. The lines $SAD_O$ to $SAD_{15}$ lead to the address bus (5 in FIG. 4). The lines SD to $SD_7$ lead to the data bus (6 in FIG. 4). The remaining lines lead to the control bus (4 in FIG. 4). the designations of the last-mentioned line are as follows:

$\overline{\text{WRITE}}$: The occurrence of the WRITE signal ($\overline{\text{WRITE}}$=L) informs the module that the control computer is writing out data onto the data bus.

$\overline{\text{MMA}}$, $\overline{\text{WLTA}}$, $\overline{\text{RUN}}$: These lines serve to indicate the operating state of the module via indicators.

$\overline{\text{RUN}}$=L: The module is calculating autonomously.

$\overline{\text{WLTA}}$=L: The module has completed the calculation and transmits a stop signal to the control computer.

$\overline{\text{MMA}}$=L: The module memory is connected for purposes of data exchange to the system-address- and data bus.

READY: Via the READY input the individual computer I is brought into the WAIT-state (by READY=L) during the data exchange between the modules one with another and between the modules and the control computer.

RESET: During the transmission of the reset signal, in the individual computer I the program counter is set to 0. After the reset, the program sequence commences at the position 0 in the store.

$\phi_1$, $\phi_2$: are two phase-displaced timing signals DBIN, WAIT, WR, SYNC Input, Output: These signals serve to test the individual computers. During the normal operation of the computer system in accordance with the invention they are of no significance. Their designations correspond to the signal designations given in the Intel catalogue 1975 in the description of the microprocessor module 8080.

$\overline{\text{WOUTPUT}}$: Via this line the module can transmit an output signal ($\overline{\text{WOUTPUT}}$=L).

WHLTA, $\overline{\text{WHLTA}}$: These signals indicate the STOP state of the computer.

MODUS: By MODUS=H items of data are fed through from the data bus to the module memory, if the reverse data flow direction is not already switched through.

$\overline{\text{WSIN}}$: This signal ($\overline{\text{WSIN}}$=L) indicates that the module is ready to apply data from the module memory onto the data bus.

$\overline{\text{WSOUT}}$: The signal WSOUT=L indicates that the module is ready to transfer data from the data bus into the module memory.

SYSEN: SYSEN=H serves to enable the switch to connect the module memory to the address-and data bus, if $\overline{\text{WSIN}}$=L or $\overline{\text{WSOUT}}$=L.

I/O IN: As a result of the transmission of this signal, the control computer informs the module that it wishes to read out data from a module memory.

I/O OUT: As a result of the transmission of this signal, the control computer informs the module that it wishes to write-in data into a module memory.

T I/O: With the timing signal the switch control logic receives the switch control information transmitted from the control computer via address-and control bus in a register.

CLEAR: Via the CLEAR input the switch control register is erased.

$\overline{\text{WSEL}}$: Via the $\overline{\text{WSEL}}$ output, the switch control logic reports as to whether the module has been selected by the contents of the address bus or the input $\overline{\text{CSEL}}$.

$\overline{\text{CSEL}}$: By means of $\overline{\text{CSEL}}$=L, the module is selected independently of the contents of the address bus.

Note: The signals $\overline{\text{WOUTPUT}}$, WHLTA, $\overline{\text{WHLTA}}$, $\overline{\text{WSIN}}$, $\overline{\text{WSOUT}}$, $\overline{\text{WSEL}}$ are output signals of the module, which are produced with the aid of open-collector gates which are shown by a spot above the gate in the circuit diagram. In the case of the parallel connection of a plurality of modules, these signals can thus be logic-linked by a wired OR or by a wired AND.

FIG. 6 schematically illustrates a switch which forms a component of each module. The function of this switch is to connect the module memory either to the individual computer or to the system address-or data-bus. As can be seen from FIG. 6, items of address information can pass from the individual computer or from the system to the module memory, whereas items of data information can pass from the individual computer or the system to the module memory, but can also flow in the reverse direction. The switch illustrated in FIG. 6 is controlled via the three control inputs. The connection path is controlled via the control input SBUS. If the signal H is present at this control input, the connection of the module memory to the system bus is established. If, on the other hand, this control input bears the signal L, the module memory is connected to the individual computer. The direction of the bus is controlled via the inputs DBIN and SIN. The input DBIN is active when module memory and individual computer are connected. When the signal H is present at the control input DBIN, the data flow takes place from the module memory to the data bus of the individual computer. If this input terminal carries the signal L, the direction of the data flow is reversed. The input SIN is active when the module memory and system bus are connected. If the signal H is present at the terminal SIN, the data flow takes place from the module memory to the data bus of the system. If, on the other hand, this terminal bears the signal L the data flow is the reverse. The switch is controlled by the switch control logic. FIG. 7 is a block circuit diagram of this switch control logic. FIG. 8 also schematically illustrates the switch control logic with all its inputs and outputs. The function of the switch control logic is to recognize whether the module to which it belongs has been selected. Selection criteria are constituted by the information content of the address bus and also the switching state of the line $\overline{CSEL}$. The switching unit status latch receives the applied information with the timing signal. CLEAR resets the outputs to 0. Via the lines SIN and SBUS the transfer-enable logic controls the switch in dependence upon the contents of the status latch and that of the control lines (SYSEN, MODUS) in the following manner:

(a) As a result of SYSEN=H the state of the status latch is directly employed for the control of the switch,
(b) The MODUS input is active only when the output of the status latch $I_2$ is equal to L. As a result of MODUS=H the switch is switched in such manner that a data transfer from the system bus to the module memory is possible. This switching state serves to allow parallel write-in into the various module memories during the read-out from a special module memories.

In addition the transfer-enable-logic supplies acknowledgement signals to the exterior WSIN, WSOUT which are required for the interconnection of a plurality of switches.

Figure 9:
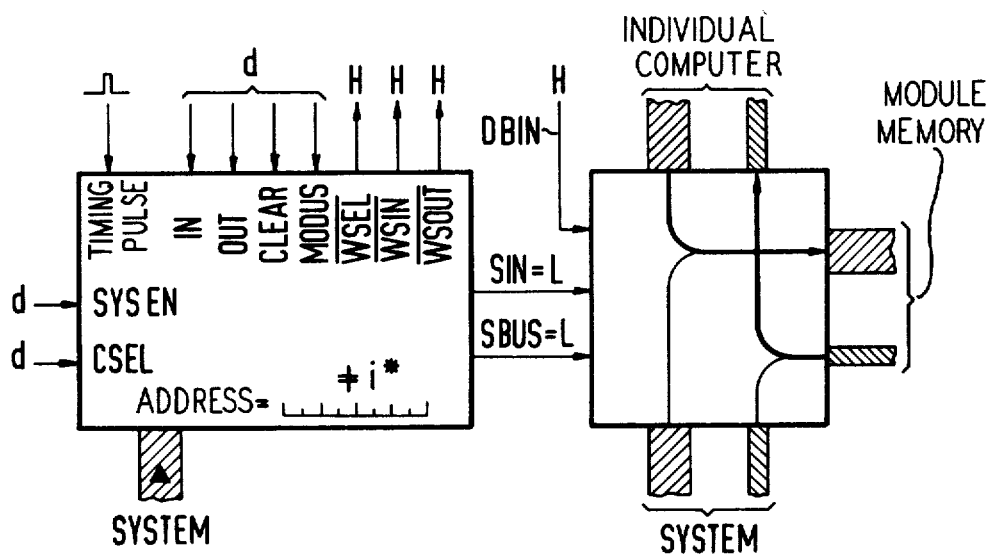
FIGS. 9 to 14 show the switch and the switch control logics of various operating states.

FIGS. 9 to 14 illustrate the possible switch positions. Here it should be noted that the signals provided with a star are transferred with the timing signal in the status latch, whereas the others directly influence the switch position. FIG. 9 shows the switch position in which items of information are transferred from the module memory into the individual computer.

Figure 10:
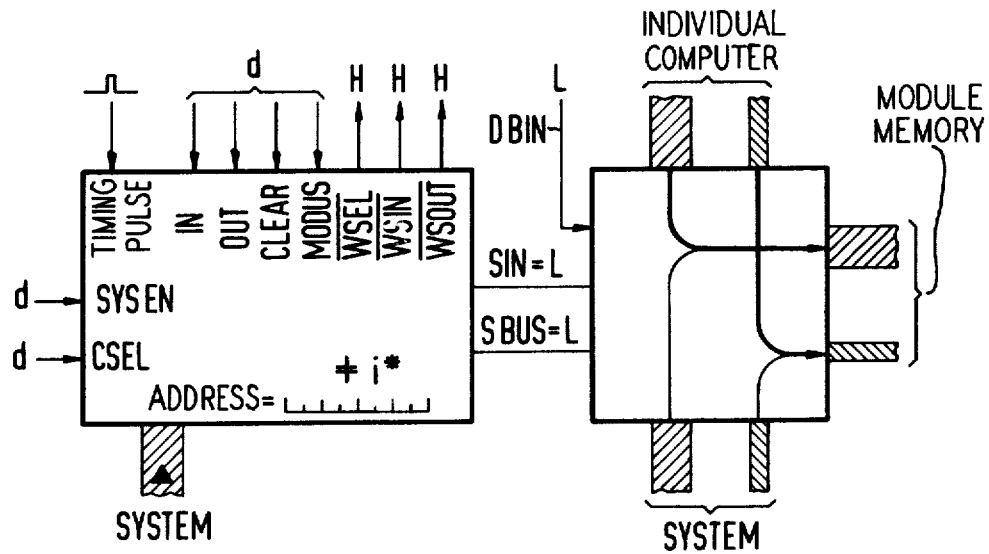

FIG. 10 shows a switch position during which items of information are transferred from the individual computer into the module memory.

Figure 11:
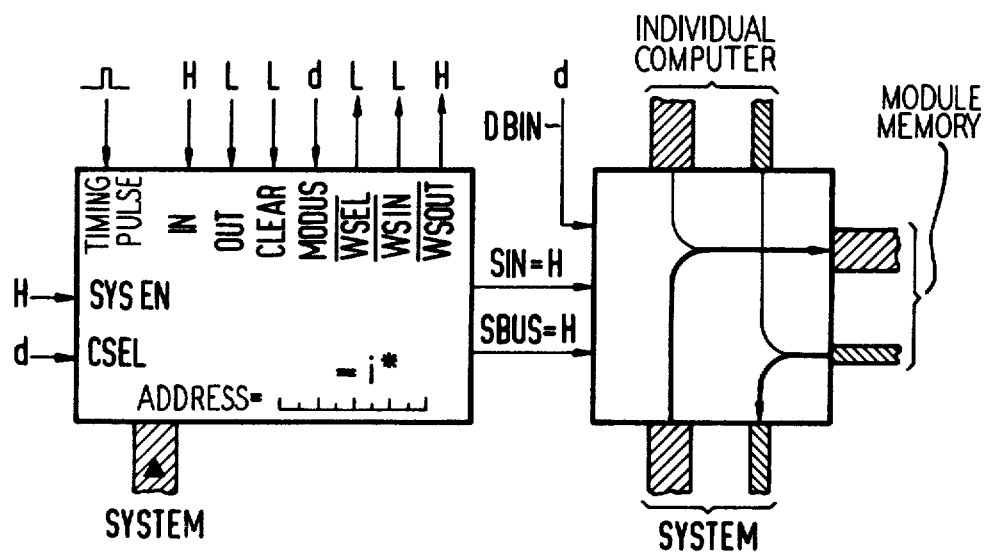

FIG. 11 shows a switch position in which items of information are transferred from the module memory into the system.

Figure 12:
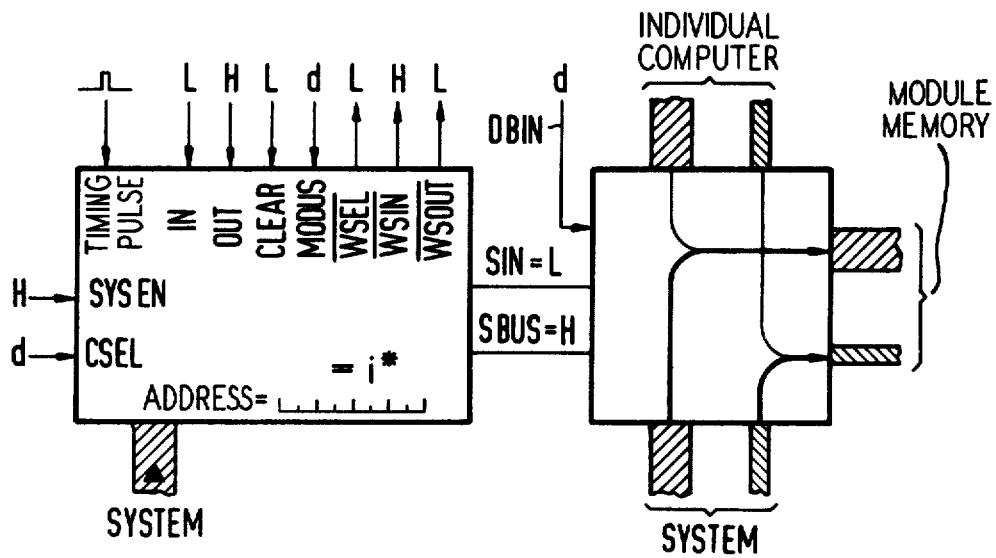
Figure 13:
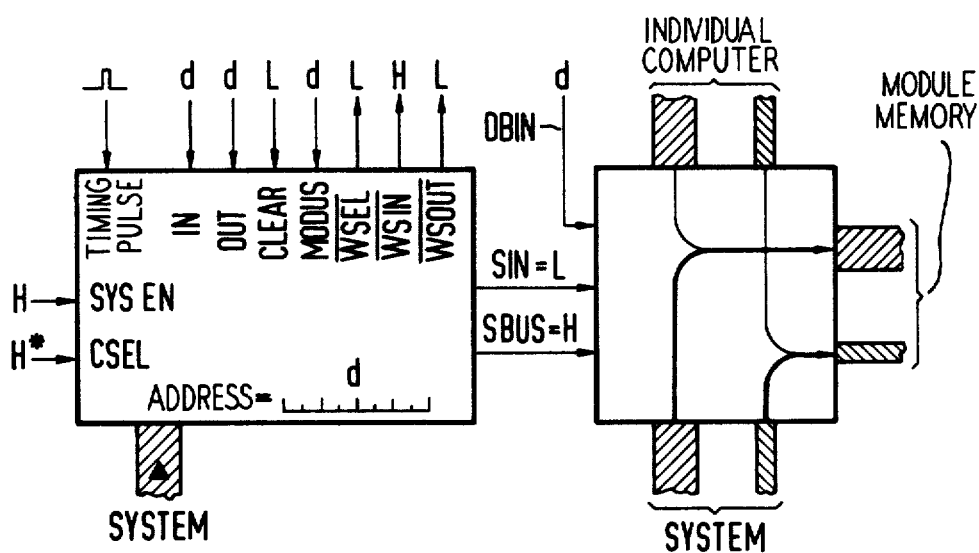
Figure 14:
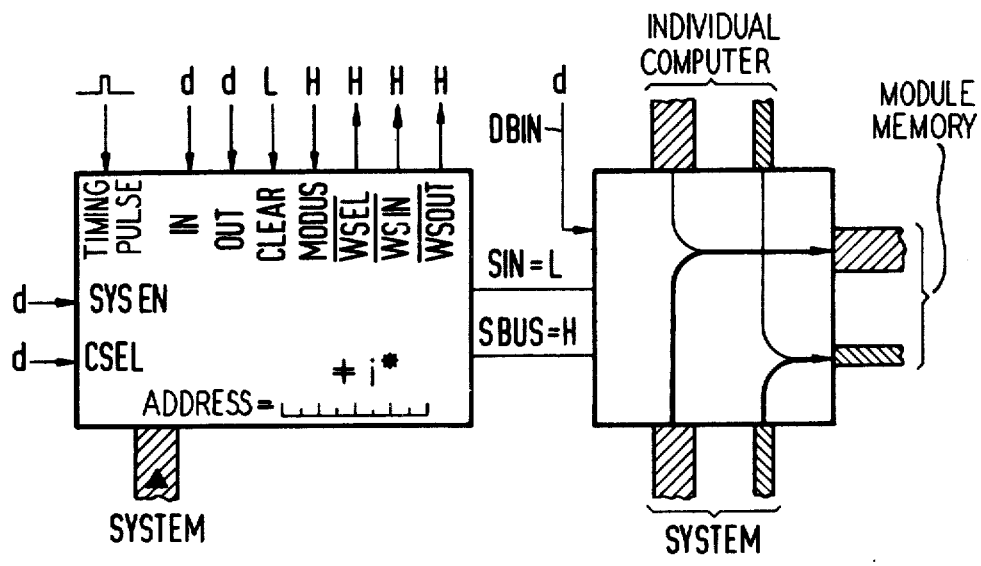

FIGS. 12, 13 and 14 show switch positions during which items of information are transferred from the system into the module memory.

Figure 15:
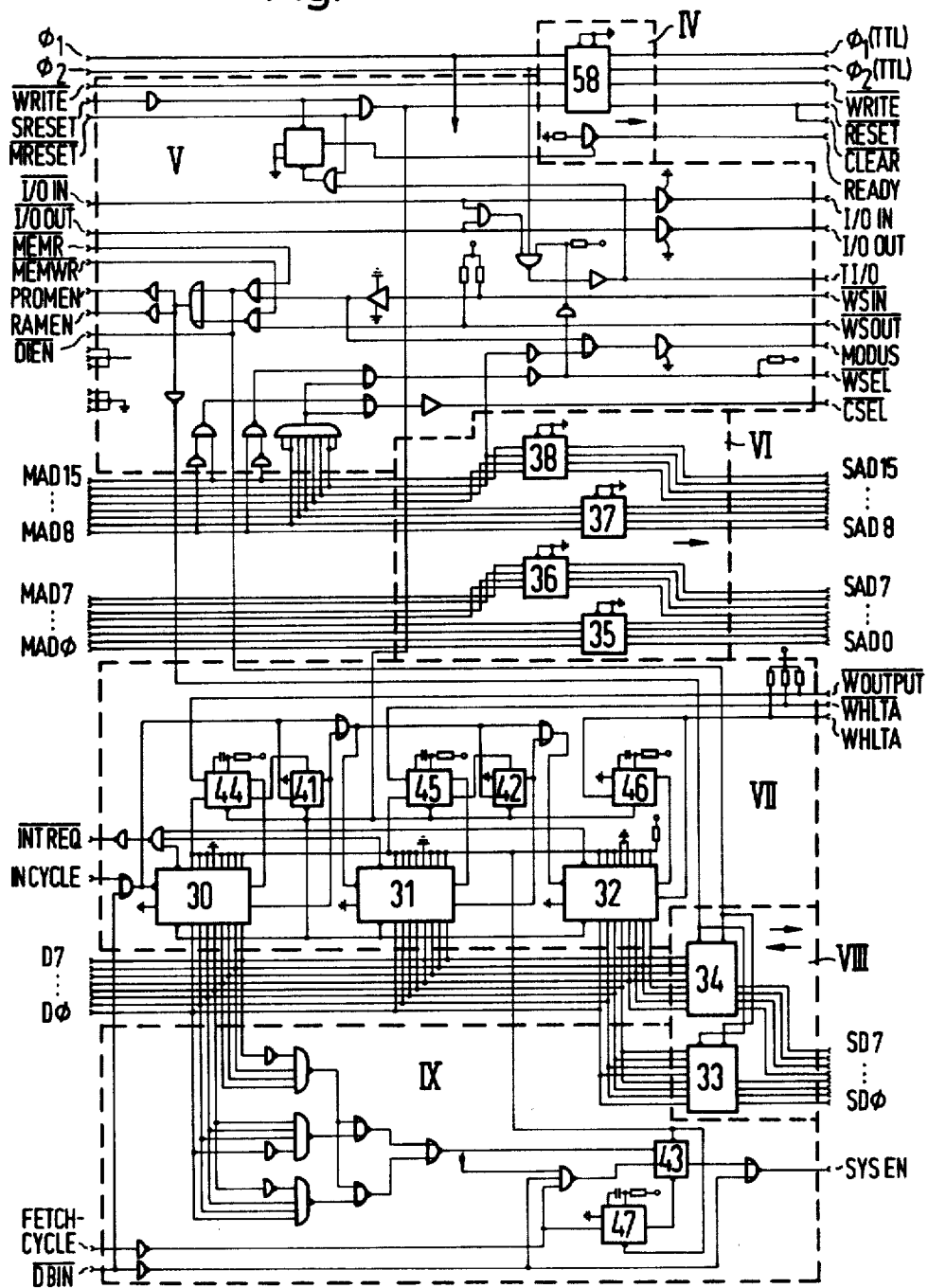
FIG. 15 shows the complete circuit of the interface structure.
Figure 16A:
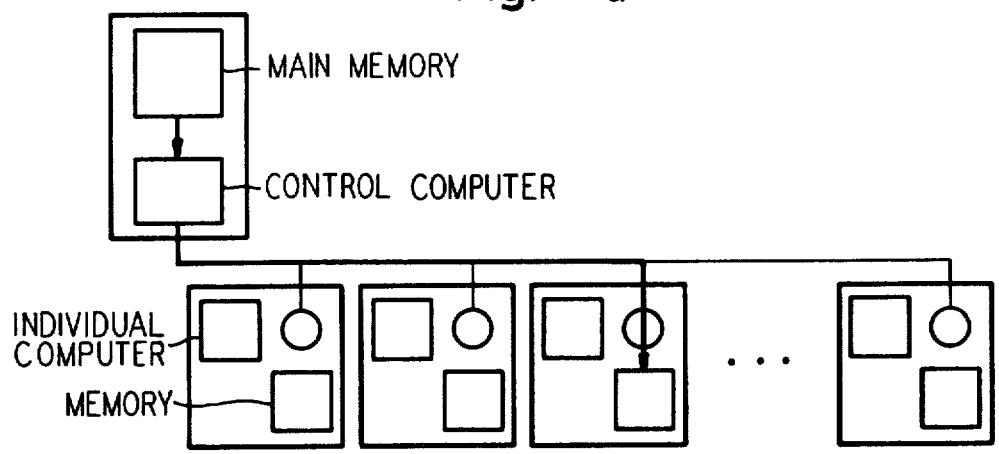
FIGS. 16$a$, $b$, $c$, $d$, $e$ show the data flow under various operating conditions, and FIG. 17 schematically illustrates the construction of the software.
Figure 16B:
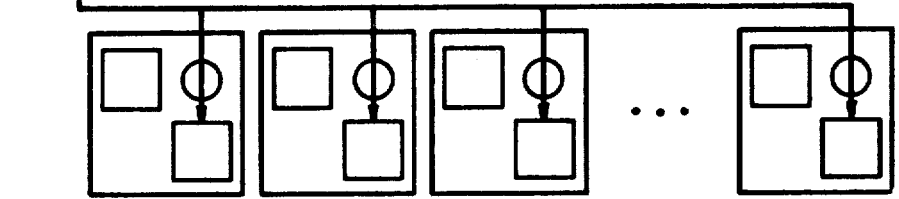
Figure 16C:
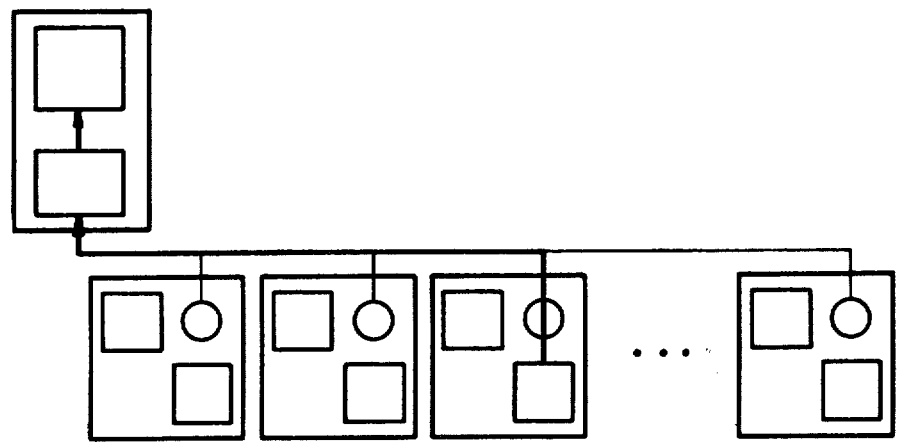
Figure 16D:
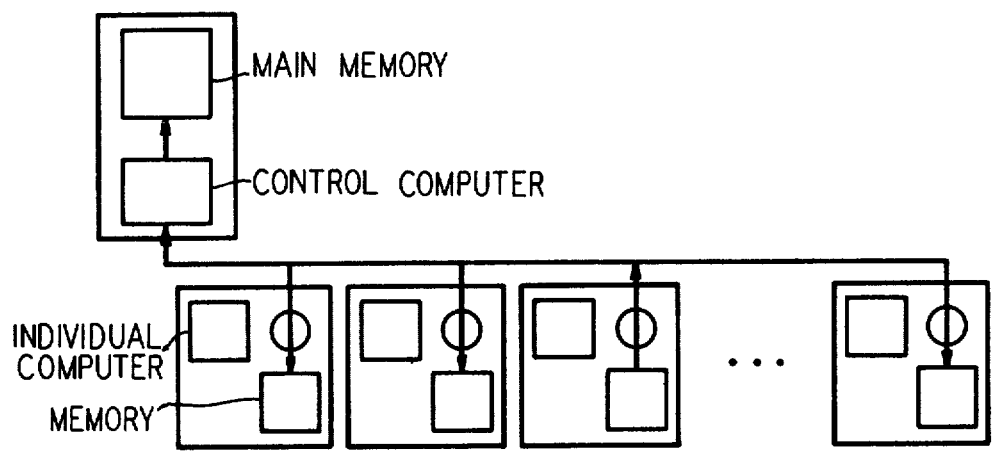
Figure 16E:
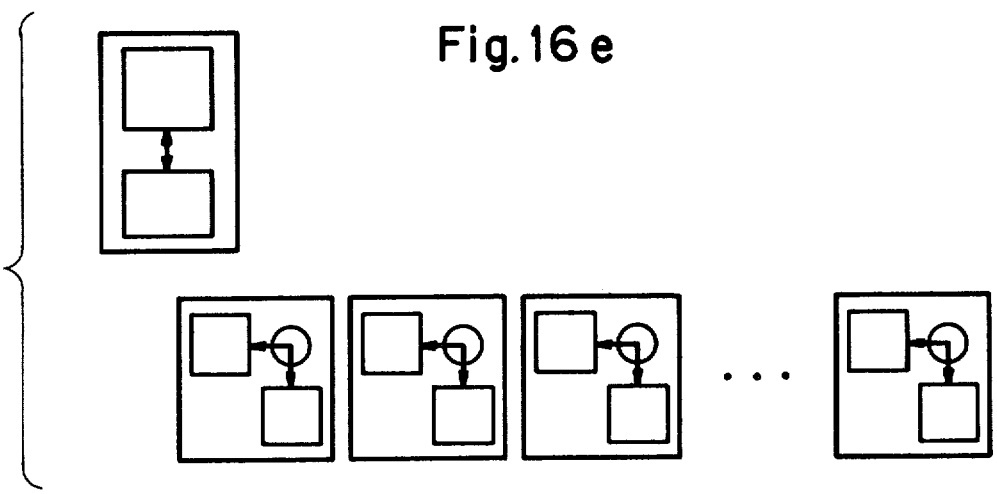

FIG. 15 shows the interface which again is constructed from three input-output elements 30, 31 and 32 of the type 8212 of the firm Intel and seven two-path bus drive devices of the type 8216 of the firm Intel. In addition the circuit contains three D-flip-flops 41, 42, 43 of the type Ser. No. 7474 of the firm Siemens AG and four monoflops 44, 45, 46, and 47 of the type Ser. No. 74123 (Siemens Data Book 1976/77 "Digital Circuits") of the firm Siemens AG. The terminal designations again correspond to the corresponding designations of the manufacturers of the components employed, and the gate amplifiers and other components which have also been used are shown in a standardized illustration. The interface shown in FIG. 6 can also be classified into function blocks, which can be related to the illustration in FIG. 4. Thus, the function block IV corresponds to the illustration of the bus drive device 1 in FIG. 4, whereas the transmission logic V and IX and the interrupter logic VII correspond to the control logic in FIG. 4. In addition the bus drive device VI corresponds to the bus drive device 2 in FIG. 4, whereas the bus drive device VIII corresponds to the corresponding element 3 in FIG. 4. The interrupt logic VII, under the control of the modules, transmits interrupt signals to the control computer.

The transmission logic V and IX serves to differentiate memory positions in the main memory and the memories of the individual computers. This logic acts in the communication phase and in the control phase, when items of data are transmitted under the control of the control computer. This logic connects the control computer alternately to the control computer memory in order to obtain commands from the control program and to the module memories or to the control computer memory in order to enable the data exchange.

The lines on the left-hand side emanate from the control computer and those on the right-hand side connect the interface to the computer modules and in fact the terminals $SAD_O$ to $SAD_{15}$ are connected to the address bus, whereas the terminals SD to $SD_7$ are connected to the data bus and the remaining terminals on the right-hand side are connected to the control bus.

The interrupt logic VII can transmit the following interrupt signals to the control computer:
$I_1$ interruption after stop message of an arbitrary module (via wired OR),
$I_2$ interrupt after stop message of all modules (via wired AND),
$I_3$ interrupt after output message of an arbitrary module (via wired OR).

The interrupt signal $I_1$ facilitates the handling of problems in which all the modules hunt a specific solution, which however is found at different speeds or only by individual modules (e.g. hunting functions).

$I_2$ is the interruption which does not instigate the exchange of the result until all the modules have ended their calculations.

Via $I_3$ an arbitrary module can, during the running of its program, transmit a specially agreed interruption to the control computer e.g. fault messages (division by 0 or similar).

FIG. 16 serves to explain the data flow. The data paths are dependent upon the switching state of the switch of the individual modules. Thus in accordance with FIG. 16a, items of data can be transferred from the main memory to the memories of the individual computers. In accordance with FIG. 16b, items of data can be transmitted from the main memory simultaneously to all the module memories. In accordance with FIG. 16 items of data can be transmitted from the memory of a selected computer module to the main memory and in accordance with FIG. 16d items of data can be transmitted from the memory of an individual computer simultaneously to the memories of all the other individual computers and the main memory. FIG. 16e finally shows the connection of the data paths in the autonomous phase.

The system- and user programs must be matched to the construction and the organization of the computer.

FIG. 17 gives a view of the construction of the software. The control computer executes the following programs:

MONITOR is a program parcel which facilitates the operation of the computer system from a console and contains auxiliary programs for the input and output.

START is a program which assists the flow of the control phase and the initiation of the autonomous phase.

DISP is a program which produces the data exchange between the during the information exchange phase.

The individual modules execute the following system programs.

AUTO interprets the item of information received by the control computer in the control phase and initiates the requested user routine.

HALT reports the execution of the order to the control computer and brings the module into the waiting state.

As can also be seen from FIG. 17, the system program is hierarchically organized in two levels. The upper level consists of the functions of the control computer, whereas the lower level comprises the system functions distributed between the modules.

The user programs must also be organized in modular fashion in the same way as the system program, as can also be seen from FIG. 17.

Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of operating a computer system in which a control computer and a plurality of individual computers each have a memory, and switching devices are connected between the inputs and outputs of the memories and the control computer, comprising the steps of:

executing a program with the control computer to inform the individual computers of the respective processes they are to carry out;

simultaneously and independently operating the individual computers through their assigned processes;

generating a stop signal with each individual computer upon completion of the assigned process;

transmitting the stop signals to the control computer; and exchanging data between the individual computers under the control of the control computer.

2. The method of claim 1, wherein the step of exchanging data is further defined as:

determining the number of stop signals received by said control computer; and exchanging data only after determining that all stop signals have been received.

3. The method of claim 1, wherein the step of exchanging data is further defined as:

determining the number of stop signals received by said control computer; and exchanging data upon receipt of the stop signals from predetermined ones of said individual computers.

* * * * *